United States Patent [19]

Yoshikawa et al.

[11] Patent Number: 5,201,187

[45] Date of Patent: Apr. 13, 1993

[54] SYSTEM FOR CONTROLLING COOLING EQUIPMENT

[75] Inventors: Tomio Yoshikawa; Takashi Kato, both of Shimizu; Tetsuji Yamashita, Shizuoka; Kyoshiro Murakami, Shimizu; Shizuo Zushi, Hadano, all of Japan

[73] Assignee: Hitachi, Ltd., Tokyo, Japan

[21] Appl. No.: 463,559

[22] Filed: Jan. 11, 1990

[30] Foreign Application Priority Data

Jan. 20, 1989 [JP] Japan ..................... 1-11129

[51] Int. Cl.$^5$ ................ F25D 29/00; F25D 17/02; F25B 49/00; F25B 41/00
[52] U.S. Cl. ..................... 62/126; 62/130; 62/175; 62/185; 62/201; 62/203; 361/385; 165/104.33
[58] Field of Search .............. 62/175, 126, 130, 228.4, 62/201, 203, 185; 361/385; 165/104.33

[56] References Cited

U.S. PATENT DOCUMENTS

| 4,660,386 | 4/1987 | Hansen et al. | 62/126 |
| 4,674,291 | 6/1987 | Kitauchi | 62/126 |
| 4,821,528 | 4/1989 | Tershak | 62/126 |
| 4,829,779 | 5/1989 | Munson et al. | 62/175 |
| 4,876,859 | 10/1989 | Kitamoto | 62/175 |

FOREIGN PATENT DOCUMENTS

| 0157745 | 12/1981 | Japan | 62/175 |
| 0075649 | 5/1983 | Japan | 62/126 |
| 0153033 | 9/1983 | Japan | 62/126 |
| 0009440 | 1/1984 | Japan | 62/175 |
| 0175546 | 8/1987 | Japan | 62/126 |
| 207956 | 8/1988 | Japan | |

Primary Examiner—John K. Ford
Attorney, Agent, or Firm—Antonelli, Terry, Stout & Kraus

[57] ABSTRACT

A control system for controlling cooling equipment comprising a refrigerant circuit for cooling water by heat exchange, a plurality of cooling modules in a backup relationship with an adjusting apparatus for adjusting the cooling capability of the refrigerant circuit and a controller controlling the adjusting apparatus for adjusting the cooling capability, a control module having a coolant temperature sensor and a controller for calculating a cooling capability control command based on the value detected by the coolant temperature sensor. The controller in one of the cooling modules controls the adjusting apparatus and on the cooling capability control commend transmitted from the controller in the control module. Each of the cooling modules has a coolant temperature sensor for detecting the same coolant temperature as detected by the coolant temperature sensor of the control module so that, when an abnormality occurs in the coolant temperature sensor in the control module, the controller in the control module calculates the cooling capability control command based on the value detected by the coolant temperature sensor in the cooling module. The control system is therefore capable of performing a backup operation effective for the occurrence of an abnormality in the control module.

8 Claims, 3 Drawing Sheets

SYSTEM FOR CONTROLLING COOLING EQUIPMENT

BACKGROUND OF THE INVENTION

The present invention relates to a system for controlling cooling equipment for water-cooling a body to be cooled, and particularly to a control system exhibiting an improved backup operation function when some trouble occurs.

A conventional apparatus having cooling equipment provided with a backup function is disclosed in Japanese Patent Unexamined Publication No. 63-207956. This apparatus is designed so that, when some trouble occurs in one cooling module of the cooling equipment having a plurality of equal refrigerant circuits, the operation is continued by switching the cooling operation to another back-up cooling module. Although the above-mentioned prior art is capable of performing an effective backup operation when some trouble occurs in one of a plurality of cooling modules, no consideration is given to cases where some trouble occurs in a control module for controlling the plurality of cooling modules in the cooling equipment comprising the plurality of cooling modules and the control module. The conventional apparatus therefore has a drawback in that the occurrence of some trouble in the control module causes some trouble in the operation of the cooling equipment, and in its turn a system including a body to be cooled.

SUMMARY OF THE INVENTION

It is an object of the present invention to provide a control system which is capable of performing a backup operation effective for the occurrence of some trouble in the control module in cooling equipment comprising the control module and a plurality of cooling modules.

To achieve the above object, cooling equipment in the present invention comprises a refrigerant circuit for cooling water, a plurality of cooling modules in a backup relationship each of which is provided with a controller for controlling a means for adjusting the cooling capability of the refrigerant circuit and which have the same structure, a plurality of pumps in a backup relationship which circulate cooling water in a body to be cooled, a control module provided with a coolant temperature sensor for detecting the temperature of the cooling water and a controller for calculating a cooling capability control command, and a transmission line for transmitting information between the controller of one of the cooling modules and the controller of the control module, the controller of one of the cooling modules controlling the cooling capability adjusting means on the basis of the cooling capability control command which is transmitted from the controller of the control module, each of the cooling modules having a coolant temperature sensor for detecting the same water temperature as that detected by the coolant temperature sensor of the control module so that the controller of the control module calculates the cooling capability control command on the basis of the value which is detected by the coolant temperature sensor of one of the cooling modules and which is transmitted through the transmission line when an abnormality occurs in the coolant temperature sensor of the control module.

In another constitution, the cooling equipment is so formed that each of the cooling modules has a coolant temperature sensor for detecting the same water temperature as that detected by the coolant temperature sensor of the control module so that, when an abnormality occurs in the coolant temperature sensor of the control module, the controller of the control module sends a message with respect to the occurrence of an abnormality to the controller of one of the cooling modules through the transmission line, and the controller of the cooling module receiving it calculates the cooling capability control command on the basis of the value detected by the coolant temperature sensor of the cooling module and controls the cooling capability adjusting means on the basis of the command.

In a further constitution, the cooling equipment is so formed that each of the cooling modules has a coolant temperature sensor for detecting the same water temperature as that detected by the coolant temperature sensor of the control module so that when the controller of one of the cooling modules detects the occurrence of an abnormality in information transmittance between the control module and one of the cooling modules, the controller of the cooling module calculates the cooling capability control command on the basis of the value detected by the coolant temperature sensor of the cooling module and controls the cooling capability adjusting means on the basis of the command.

The control system of the present invention having each of the above-described constitutions enables the operation of the cooling equipment to be continued by using the coolant temperature sensor of each of the cooling modules and the controller thereof in place of the coolant temperature sensor of the control module and the controller thereof when an abnormality occurs in the coolant temperature sensor of the control module or in the transmission caused by some trouble in the controller of the control module or the transmission line.

In other words, even if some trouble occurs in the coolant temperature sensor or the controller of the control module or an abnormality occurs in the transmission between the control module and the cooling modules, a backup operation is performed so as to ensure the controlling of the coolant temperature. In addition, when some trouble occurs in the controller of the control module, it can be ensured that the cooling water is circulated by the pump. As a result, the required cooling water is continuously supplied to the body to be cooled.

DETAILED DESCRIPTION OF PREFERRED EMBODIMENTS

Figure 1:
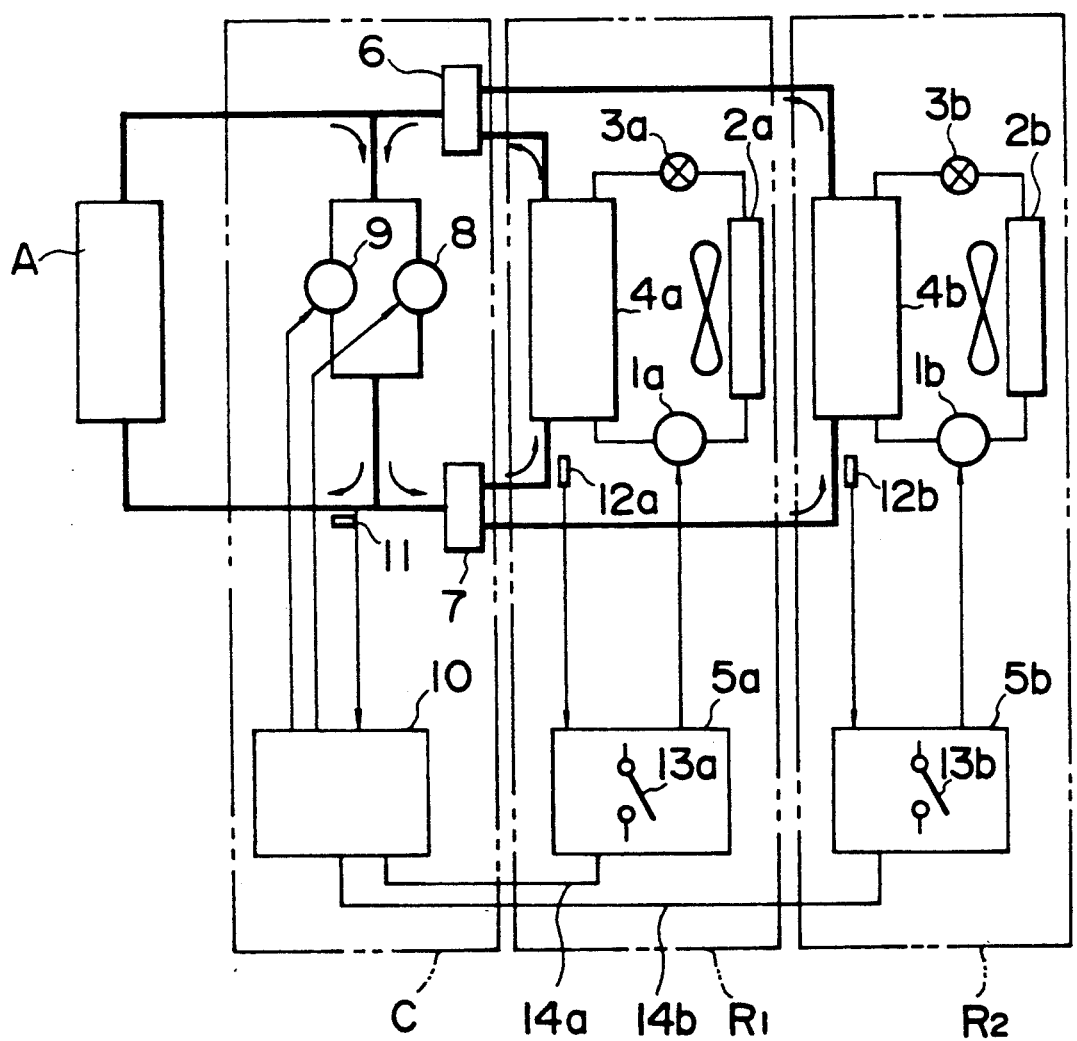
FIG. 1 is a block diagram of cooling equipment in an embodiment of the present invention.

In FIG. 1, a first cooling module $R_1$ and a second cooling module $R_2$ have the same structure comprising a refrigerant circuit having a refrigerant compressor $1a$, $1b$, a condensor $2a$, $2b$, an expansion valve $3a$, $3b$ and an evaporator $4a$, $4b$, a controller $5a$, $5b$ and a coolant temperature sensor $12a$, $12b$. The heavy lines in the drawing denote the passage of cooling water, and the arrows indicate the direction of the flow of cooling water. A control module C is provided with passage switching sections 6, 7, two cooling pumps 8, 9 having the same structure, a controller 10 and a coolant temperature sensor 11. Character A denotes a body to be cooled.

One of the two cooling modules $R_1$ and $R_2$ is a main module which is operated ordinarily, the other being a back-up module. One of the two pumps 8, 9 is a main pump which is operated ordinarily, the other being a back-up pump. The back-up module is operated when the main module has some trouble. The back-up pump is operated when the main pump has some trouble. However, the main and back-up modules and the main and back-up pumps are rotated so that they alternately serve as the main module and the main pump or the back-up module and the back-up pump during certain time intervals (for example, one day). The backup switching between the main module and the back-up module and between the main pump and the back-up pump and the rotation therebetween are not the gist of the present invention and thus this feature is not described in detail below.

The water which is cooled by heat exchange in the evaporator $4a$, $4b$ in the first cooling module $R_1$ or the second cooling module $R_2$ and passed through the passage switching section 6 and the water warmed by the body A to be cooled are joined, agitated by the pump 8 or 9 and then discharged as cooling water. Part of the cooling water flows to the body A so as to cool it and then again returns to the junction point, while the remainder is passed through the passage switching section 7, cooled by the evaporator $4a$ or $4b$ in the cooling module $R_1$ or $R_2$, passed through the passage switching section 6, and again joined with the water returned from the body A. Such circulation of water cools the body A to be cooled.

The compressor $1a$, $1b$ of the first or second cooling module $R_1$ or $R_2$ is driven by a variable frequency inverter so that the rotational frequency of the compressor $1a$, $1b$, and in its turn, the cooling capability of the cooling module $R_1$ or $R_2$, can be adjusted by controlling the frequency of the inverter by using the controller $5a$, $5b$. Various items of data are transmitted and received by serial transmission through a transmission passage $14a$, $14b$ between the controller $5a$, $5b$ in the cooling module $R_1$ or $R_2$ and the controller 10 in the control module C.

During normal operation, the control module C detects the temperature of the cooling water sent to the body A by using the sensor 11, the controller 10 compares the coolant temperature detected with the coolant temperature set in the controller 10, calculates the inverter frequency required for obtaining the cooling capability of each cooling module required for bringing the deviation in the coolant temperature within a permissible range and transmits the frequency calculated to the controller $5a$ or $5b$ in the cooling module $R_1$ or $R_2$. The controller $5a$ or $5b$ controls the frequency of the inverter for driving the compressor $1a$ or $1b$ on the basis of the command with respect to the frequency.

Figure 2:
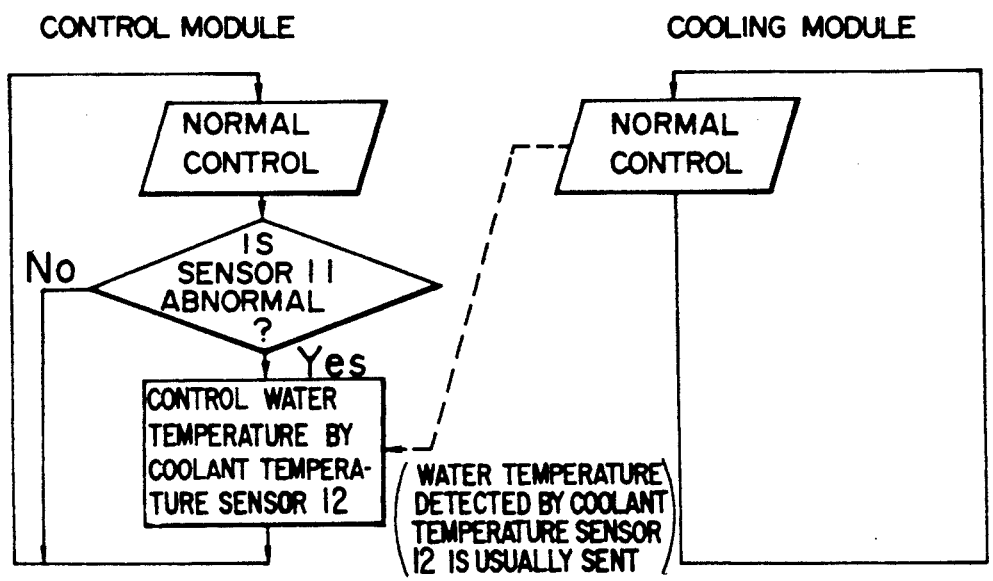
FIGS. 2 and 3 are respectively flow charts showing the operation of the cooling equipment.

In the first cooling module $R_1$ or the second cooling module $R_2$, the temperature of the water flowing therethrough is usually detected by the coolant temperature sensor $12a$, $12b$ and the coolant temperature detected is sent to the controller 10 in the control module C from the controller $5a$ or $5b$. As seen from FIG. 1, since both the coolant temperature sensor 11 and the coolant temperature sensor $12a$ or $12b$ detect the temperature of the water discharged from the pump 8 or 9, the coolant temperatures detected by both the sensors are the same. The control module C usually checks whether or not an abnormality occurs in each equipment, and when an abnormality (the breaking of wire or short circuit) is detected in the sensor 11 in the control module C, the controller 10 in the control module C compares the coolant temperature, which is detected by the sensor $12a$ or $12b$ and sent from the cooling module, with the set coolant temperature, calculates the necessary inverter frequency as described above and sends the frequency to the controller $5a$ or $5b$ in the cooling module $R_1$ or $R_2$ so as to control the frequency of the inverter for driving the compressor $1a$ or $1b$ in the same way as that described above. FIG. 2 is a schematic flowchart which shows the above-mentioned controlling of the operation.

Figure 3:
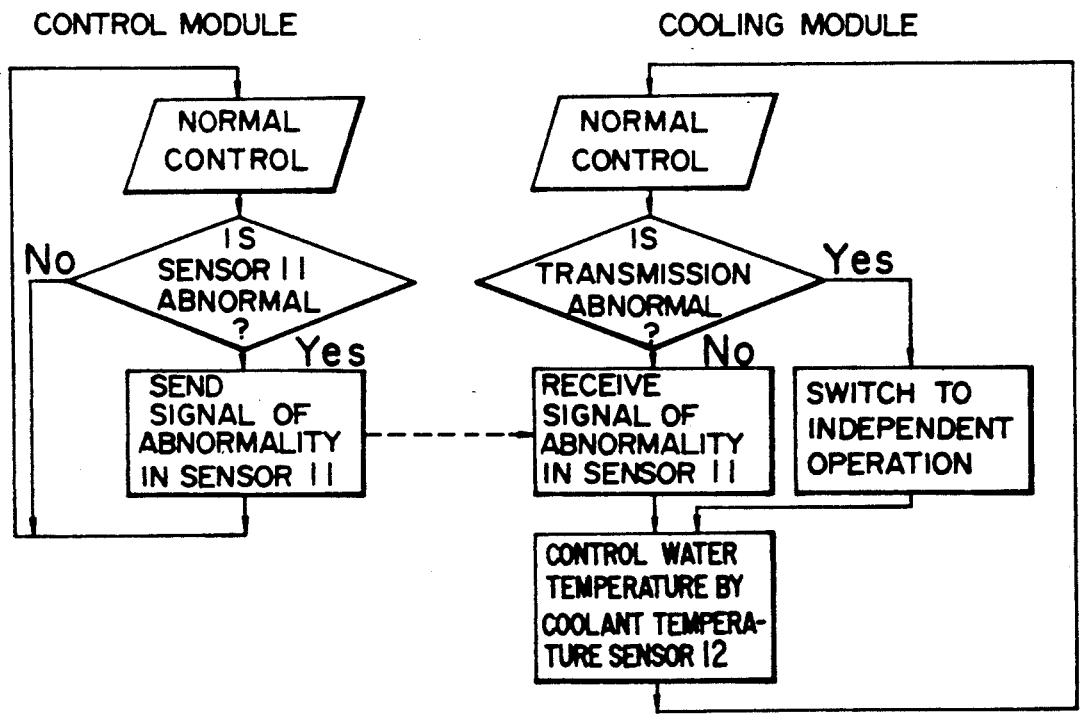

As shown in FIG. 3, when the controller 10 in the control module C detects an abnormality in the coolant temperature 11 in the control module C, a message with respect to the abnormality is sent to the controller $5a$ or $5b$ in the cooling module $R_1$ or $R_2$ from the controller 10, and the controller $5a$ or $5b$ receiving it calculates the required inverter frequency corresponding to the difference between the coolant temperature detected by the coolant temperature sensor $12a$ or $12b$ in the cooling module $R_1$ or $R_2$ and the set coolant temperature sent from the controller 10 in the control module, whereby the frequency of the inverter for driving the compressor $1a$ or $1b$ can be controlled by the controller $5a$ or $5b$.

Further, as seen from FIG. 3, when some trouble occurs in the controller 10 in the control module or when some trouble occurs in the transmission line $14a$ or $14b$, the controller $5a$ or $5b$ in the cooling module $R_1$ or $R_2$ detects the trouble by parity check and switches the operation of one cooling module to an independent operation. In the independent operation, the controller $5a$ or $5b$ of the cooling module $R_1$ or $R_2$ calculates the required inverter frequency by comparing the water temperature detected by the coolant temperature sensor 12 in one cooling module with the set water temperature (stored in the controller $5a$ or $5b$ in the cooling module $R_1$ or $R_2$), which is sent from the control module, and controls the frequency of the inverter for driving the compressor $1a$ or $1b$ so that the water temperature is kept at the set water temperature. At this time, an abnormal alarm is output as a contact signal $13a$ or $13b$ from the controller $5a$ or $5b$ in the cooling module so that it is possible to inform the maintenance man of the abnormality.

Figure 4:
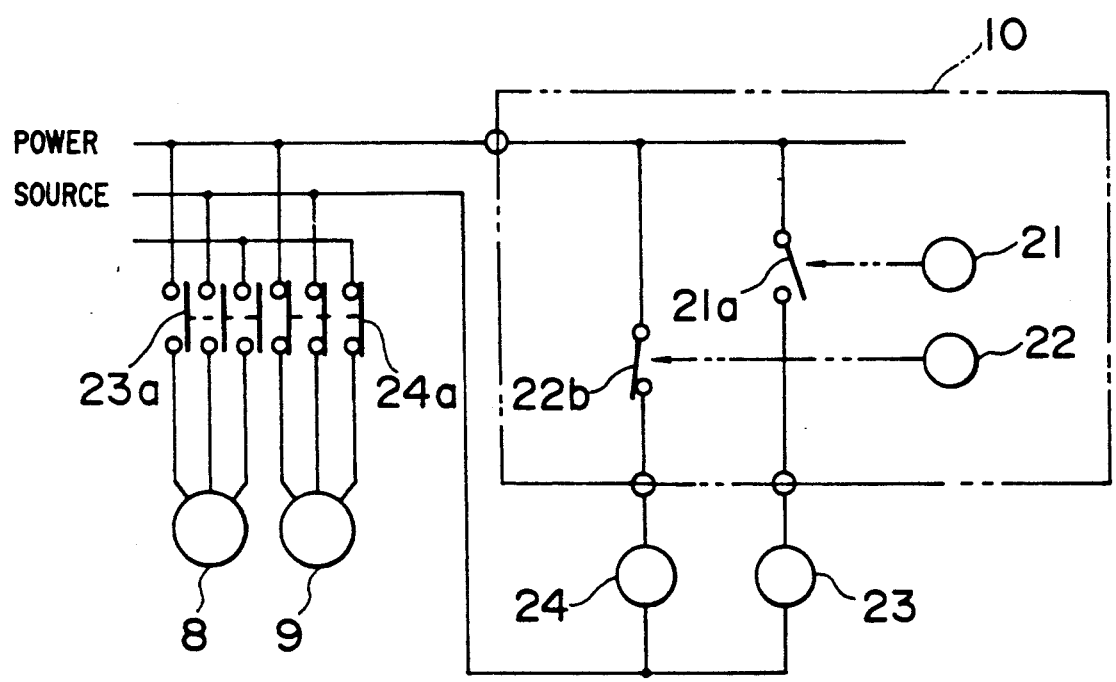
FIG. 4 is a drawing of the pump operating circuit in a control module.

The pump 8 or 9 is operated by opening and closing the contact point $23a$, $24a$ of an electromagnetic contactor 23, 24 which is energized through a contact point $21a$, $22b$ of a relay 21, 22 controlled by a microcomputer in the controller 10 in the control module C, as shown in FIG. 4. The contact point $21a$ serves as a normally open contact, and the contact point $22b$ serves as a normally closed contact. Even if some trouble occurs in the controller in the control module, therefore, one of the electromagnetic contactors 23, 24 is always energized, and one of the pumps 8, 9 is always operated, whereby the circulation of the cooling water can be maintained.

The cooling capability adjusting means of each of the cooling modules is not limited to the above-described means for controlling the inverter frequency of the compressor, and appropriate means for adjusting the cooling capability may be used.

What is claimed is:

1. A system for controlling cooling equipment including a refrigerant circuit for cooling water by heat exchange, said cooling equipment comprising:

a plurality of cooling modules in a backup relationship which have the same structure and are provided with means for adjusting the cooling capability of said refrigerant circuit and a controller for controlling said means for adjusting said cooling capability;

a plurality of pumps in a backup relationship for circulating cooling water from one of said cooling modules to a body to be cooled;

a control module having a coolant temperature sensor for detecting the temperature of said cooling water and a controller for calculating a cooling capability control command on the basis of a value detected by said coolant temperature sensor; and a transmission line for transmitting information between said controller in one of said cooling modules and the controller in said control module;

said controller in each of said cooling modules including means for controlling said cooling capability adjusting means on the basis of said cooling capability control command transmitted from said controller of said control module through said transmission line;

said system being characterized in that each of said cooling modules has a coolant temperature sensor for detecting the same water temperature as that detected by said coolant temperature sensor of said control module, and said control module includes means for detecting when an abnormality occurs in said coolant temperature sensor in said control module and means responsive to detection of said abnormality for calculating said cooling capability control command on the basis of a value detected by said coolant temperature sensor in one of said cooling modules and transmitted through said transmission line.

2. A system for controlling cooling equipment including a refrigerant circuit for cooling water by heat exchange, said cooling equipment comprising:

a plurality of cooling modules having a backup relationship therebetween and of the same structure, and being provided with means for adjusting the cooling capability of said refrigerant circuit and a controller for controlling said means for adjusting said cooling capability;

a plurality of pumps having a backup relationship therebetween for circulating the water from said cooling modules to a body to be cooled;

a control module provided with a coolant temperature sensor for detecting the temperature of said water and a controller for calculating a cooling capability control command on the basis of the value detected by said coolant temperature sensor; and a transmission line for transmitting information between said controller in one of said cooling modules and said controller in said control module;

said controller in each of said cooling modules including means for controlling said cooling capability adjusting means on the basis of said cooling capability control command transmitted from said controller in said control module through said transmission line;

said system being characterized in that each of said cooling modules has a coolant temperature sensor for detecting the same water temperature as that detected by said coolant temperature sensor in said control module, and said control module includes means for detecting when an abnormality occurs in said control module and means responsive to detection of said abnormality for sending a message with respect to abnormality to said controller in one of said cooling modules through said transmission line, and said controller in said cooling module including means responsive to a received message for calculating said cooling capability control command on the basis of a value detected by said coolant temperature sensor in said cooling module, said means for controlling said cooling capability adjusting means operating on the basis of said cooling capability control command.

3. A system for controlling cooling equipment including a refrigerant circuit for cooling water by heat exchange, said cooling equipment comprising:

a plurality of cooling modules which have a backup relationship and which have the same structure, and which include means for adjusting the cooling capability of said refrigerant circuit and a controller for controlling said means for adjusting said cooling capability;

a plurality of pumps in a backup relationship for circulating water from said cooling modules to a body to be cooled;

a control module provided with a coolant temperature sensor for detecting the temperature of said water and a controller for calculating a cooling capability control command on the basis of the value detected said coolant temperature sensor; and a transmission line for transmitting information between said controller in one of said cooling modules and said controller in said control module;

said controller of one of said cooling modules including means for controlling said cooling capability adjusting means on the basis of said cooling capability control command transmitted from said controller of said control module through said transmission line;

said system being characterized in that each of said cooling modules has a coolant temperature sensor for detecting the same water temperature as that detected by said coolant temperature sensor of said control module, and said controller of at least one of said cooling modules includes means for detecting when an abnormality occurs in transmission of information between said control module and said cooling module and means responsive to detection of said abnormality for calculating said cooling capability control command on the basis of a value detected by said coolant temperature sensor of said cooling module, said means for controlling said cooling capability adjusting means operating on the basis of said cooling capability control command.

4. A system for controlling cooling equipment according to any one of claims 1 to 3, wherein said control module includes a plurality of auxiliary relays controlling the pump control means, at least one of the auxiliary relays has a normally open contact, the other of the auxiliary relays has a normally closed contact and one of the pumps is always operable without reference to an abnormality in said pump control means.

5. A system for controlling cooling equipment according to any of claims 1 to 3, wherein said means for adjusting the cooling capability of the refrigerant circuit is a variable frequency inverter driving a refrigerant compressor.

6. A system for controlling cooling equipment according to claim 4, wherein said means for adjusting the cooling capability of the refrigerant circuit is a variable frequency inverter driving a refrigerant compressor.

7. A system for controlling cooling equipment including a refrigerant circuit for cooling water by heat exchange, said cooling equipment comprising:

a plurality of cooling modules which have a backup relationship and which have the same structure, and which include means for adjusting the cooling capability of said refrigerant circuit and a controller for controlling said means for adjusting said cooling capability;

a plurality of pumps in a backup relationship for circulating water from said cooling modules to a body to be cooled;

a control module provided with a coolant temperature sensor for detecting the temperature of said water and a controller for calculating a cooling capability control command on the basis of the value detected said coolant temperature sensor; and a transmission line for transmitting information between said controller in one of said cooling modules and said controller in said control module;

said controller of one of said cooling modules including means for controlling said cooling capability adjusting means on the basis of said cooling capability control command transmitted from said controller of said control module through said transmission line;

said system being characterized in that each of said cooling modules has a coolant temperature sensor for detecting the same water temperature as that detected by said coolant temperature sensor of said control module;

said control module including means for detecting when an abnormality occurs in said coolant temperature sensor in said control module and means responsive to detection of said abnormality in said coolant temperature sensor for calculating said cooling capability control command on the basis of a value detected by said coolant temperature sensor in one of said cooling modules and transmitted through said transmission line; and said controller of at least one of said cooling modules includes means for detecting when an abnormality occurs in transmission of information between said control module and said cooling module and means responsive to detection of said abnormality in transmission for calculating said cooling capability control command on the basis of a value detected by said coolant temperature sensor of said cooling module.

8. A system for controlling cooling equipment including a refrigerant circuit for cooling water by heat exchange, said cooling equipment comprising:

a plurality of cooling modules which have a backup relationship and which have the same structure, and which include means for adjusting the cooling capability of said refrigerant circuit and a controller for controlling said means for adjusting said cooling capability;

a plurality of pumps in a backup relationship for circulating water from said cooling modules to a body to be cooled;

a control module provided with a coolant temperature sensor for detecting the temperature of said water and a controller for calculating a cooling capability control command on the basis of the value detected said coolant temperature sensor; and a transmission line for transmitting information between said controller in one of said cooling modules and said controller in said control module;

said controller of one of said cooling modules including means for controlling said cooling capability adjusting means on the basis of said cooling capability control command transmitted from said controller of said control module through said transmission line;

said system being characterized in that each of said cooling modules has a coolant temperature sensor for detecting the same water temperature as that detected by said coolant temperature sensor of said control module;

control module and means responsive to detection of said abnormality in said control module for sending a message with respect to abnormality to said controller in one of said cooling modules through said transmission line, and said controller in said cooling module including means responsive to a received message for calculating said cooling capability control command on the basis of a value detected by said coolant temperature sensor in said cooling module; and said controller of at least one of said cooling modules includes means for detecting when an abnormality occurs in transmission of information between said control module and said cooling module, said calculating means in said cooling module being responsive to detection of said abnormality in transmission for calculating said cooling capability control command on the basis of a value detected by said coolant temperature sensor of said cooling module.

* * * * *